(12) United States Patent
Guida

(10) Patent No.: US 10,054,141 B2
(45) Date of Patent: Aug. 21, 2018

(54) ADAPTABLE FASTENING MECHANISMS FOR VARIOUS SIZED TUBING

(71) Applicant: ShareRoller LLC, New York, NY (US)

(72) Inventor: Jeffrey E. Guida, New York, NY (US)

(73) Assignee: ShareRoller LLC, New York, NY (US)

( * ) Notice: Subject to any disclaimer, the term of this patent is extended or adjusted under 35 U.S.C. 154(b) by 88 days.

(21) Appl. No.: 15/297,315

(22) Filed: Oct. 19, 2016

(65) Prior Publication Data

US 2017/0037884 A1 Feb. 9, 2017

Related U.S. Application Data

(60) Provisional application No. 62/243,661, filed on Oct. 19, 2015.

(51) Int. Cl.

| | | |
|---|---|---|
| *F16L 3/22* | (2006.01) |
| *H02G 3/32* | (2006.01) |
| *F16B 2/02* | (2006.01) |
| *F16B 2/06* | (2006.01) |
| *B62M 6/75* | (2010.01) |
| *B62M 6/45* | (2010.01) |
| *B62J 11/00* | (2006.01) |
| *B63B 25/00* | (2006.01) |

(Continued)

(52) U.S. Cl.
CPC ............. *F16B 2/065* (2013.01); *B62J 11/00* (2013.01); *B62M 6/45* (2013.01); *B62M 6/75* (2013.01); *B63B 25/002* (2013.01); *B62M 7/08* (2013.01); *B62M 7/10* (2013.01); *F16L 55/172* (2013.01); *H02G 3/32* (2013.01)

(58) Field of Classification Search
CPC ........... F16B 2/02; F16B 2/065; F16L 55/172; B63B 25/002; B26J 11/00; H02G 3/32
USPC ........ 248/230.1, 230.5, 51, 62, 63, 65, 74.1, 248/75.5, 49; 174/92, 150, 72 A, 40 CC, 174/254; 138/97, 99; 403/344, 384
See application file for complete search history.

(56) References Cited

U.S. PATENT DOCUMENTS 1,630,423 A * 5/1927 Gothberg ............... H02G 7/053
174/150
3,861,422 A * 1/1975 Christie ................ F16L 25/028
138/99

(Continued)

*Primary Examiner* — Tan Le
(74) *Attorney, Agent, or Firm* — Aaron Perez-Daple

(57) ABSTRACT

The disclosure relates to improved fastening mechanisms having both sufficient stiffness to bear a load and the ability to fit securely on a wide-range of sizes and shapes of tubing, including tapered tubing. Embodiments include a fastening mechanism with a first body part having a first inner surface, and a second body part having a second inner surface. A first fastening set may be disposed at a first end of the first and second body parts. A second fastening set may be disposed at a second end of the first and second body parts. The first and second fastening sets may be capable of securing the first and second body parts about a central tube, which may have tapered dimensions. The first inner surface and the second inner surface may each have a first subsurface and a second subsurface, the first subsurfaces may have a first contour, the second subsurfaces may have a second contour, and the first contour may fit a different size and shape of tubing than the second contour.

16 Claims, 5 Drawing Sheets

(51) Int. Cl.
*B62M 7/10* (2006.01)
*B62M 7/08* (2006.01)
*F16L 55/172* (2006.01)

(56) References Cited

U.S. PATENT DOCUMENTS

| | | | | |
|---|---|---|---|---|
| 4,015,634 | A * | 4/1977 | Christie | F16L 41/06 138/99 |
| 4,768,813 | A * | 9/1988 | Timmons | F16L 55/172 138/99 |
| 5,853,030 | A * | 12/1998 | Walding | F16L 41/12 138/103 |
| 5,950,683 | A * | 9/1999 | Henderson | F16L 55/172 138/97 |
| 8,038,174 | B2 * | 10/2011 | Jensen | F16L 13/06 138/97 |
| 8,210,210 | B2 * | 7/2012 | Clark | F16L 55/168 138/97 |
| 2004/0173373 | A1 * | 9/2004 | Wentworth | H02G 15/113 174/92 |
| 2017/0037884 | A1 * | 2/2017 | Guida | F16B 2/065 |

* cited by examiner

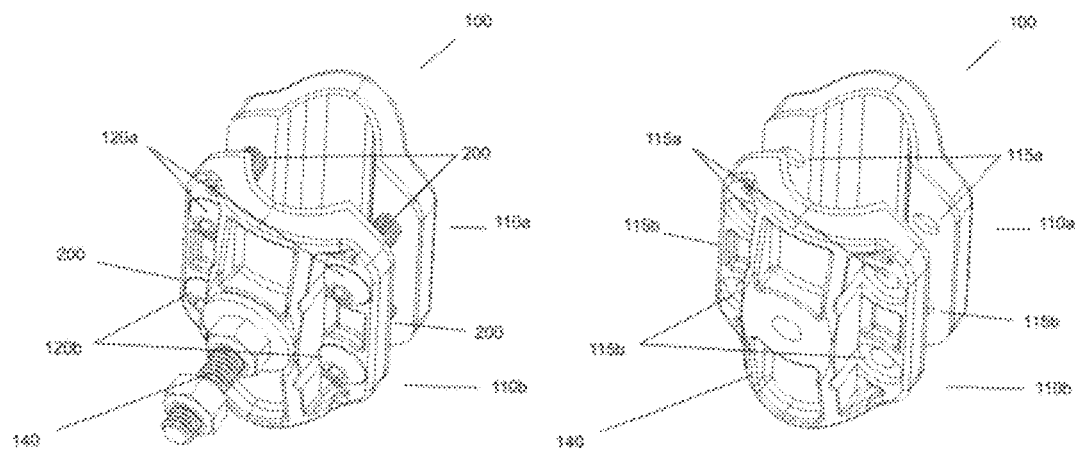
Fig. 1a                                    Fig. 1b
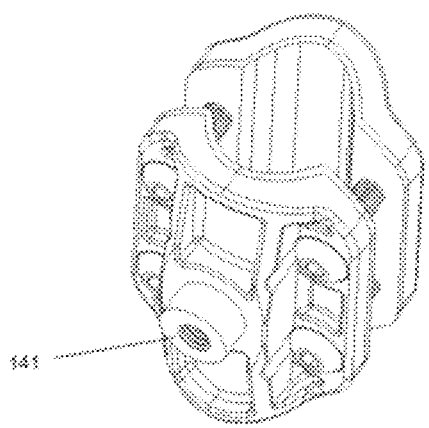         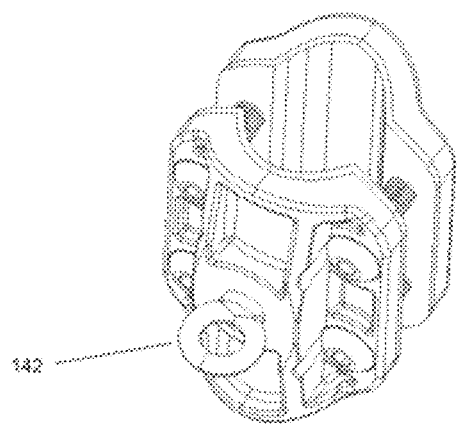
Fig. 1c                                    Fig. 1d

ADAPTABLE FASTENING MECHANISMS FOR VARIOUS SIZED TUBING

CROSS-REFERENCE TO RELATED APPLICATIONS

This application claims the benefit of U.S. Provisional Patent Application No. 62/243,661, filed on Oct. 19, 2015, which is hereby incorporated by reference in its entirety.

FIELD OF INVENTION

The inventions disclosed herein relate to the field of clamping mechanisms and load bearing fasteners, including clamps designed to attach to the tubing of a bicycle, scooter, wheelchair, motorcycle, sailboat, motor boat, jet ski, or other vehicle, in order to mount an accessory. The inventions disclosed herein have applications in other areas, such as in the home and within industry, and may generally be used wherever it is desirable to attach a load to a tube, pipe, or another object with an approximately elliptical cross-section.

BACKGROUND

Accessories are popular for adding functionality to vehicles, such as bicycles, scooters, and motorcycles. With respect to bicycles, accessories include bike racks, water bottle holders, computers, lights, mirrors, and electric motors, among other things. These accessories typically must be physically attached to the bicycle in order to work correctly and, in many cases, the position of the accessory should be fixed relative to the bicycle in a way that avoids shaking, vibration, and slippage between the bicycle and the accessory. For example, a bike rack may be attached to the forks of a bicycle, a mirror may be attached to the handlebars, and a water bottle holder may be attached to the frame. In each of these three examples, it is desirable to attach the accessory securely to the bicycle in a way that minimizes relative shaking, vibration, and slippage.

Manufacturers of vehicle accessories typically want their product(s) to work with as many vehicles as possible. A problem is that vehicles come in many different types, styles, and sizes, which makes it difficult to create a uniform method of securely attaching accessories to them. For example, bicycle tubing in the frame, forks, and handlebars varies widely in size and shape. Existing fastening systems are unable to securely attach accessories across a wide-range of tubing sizes and shapes without permanently modifying the bicycle.

It is possible to permanently attach an accessory to a bicycle, for example, by drilling holes in the tubing and using screws to mount the accessory. But this requires creating permanent holes in the tubing, which may impair structural strength, reduce the bicycle's value, and also makes it difficult to change accessories later. Welding or gluing an accessory to the bicycle creates the same type of problems by permanently modifying the bicycle and making it difficult to change accessories.

An alternative to permanently attaching an accessory is to use a removable fastening mechanism around the tubing, such as a clamp. Clamps have the advantages that they may be attached and removed from a bicycle (or other vehicle) without damaging it, and clamps may be positioned at different points on the tubing, depending on the type of accessory and the rider's preference. However, existing clamps have problems fitting securely on tubing of various sizes and shapes while bearing a load. A clamp that fits securely on one size of tubing will often not fit securely on another size of tubing. This problem is particularly severe when mounting heavy or load-bearing accessories, such as electric motors or bike racks, because the weight places a strain on the attachment point(s) of the clamp, which may cause the clamp to vibrate, slip, and/or bend; it also places a strain on the tubing, which may mar the paint finish or even dent the tubing.

Clamps, called "band clamps", have a flexible body and narrow width that allows them to fit on multiple sizes of tubing. However, the flexibility and narrowness makes these clamps unsuitable for bearing a substantial load, because there is not enough grip between the clamp and the tubing to prevent slippage and there is insufficient stiffness at the attachment point(s) to prevent vibration, among other problems. Other clamps with solid bodies exist for securely fitting onto one size and shape of tubing. However, existing solid clamps cannot fit securely onto a wide-range of shapes and sizes of tubing, because the fixed cross-section properly fits only one size and shape. Moreover, no existing clamps—flexible or solid—have the ability to fit securely onto a tapered tube while bearing a load. Tapering of the tube causes existing clamps to slide in the direction of reduced tube diameter, this problem becomes more severe as the load increases.

Accordingly, there is a need in the art for a removable fastening mechanism that combines sufficient stiffness to bear a load with the ability to fit securely on a wide-range of sizes and shapes of tubing, including tapered tubing.

SUMMARY OF THE DISCLOSURE

The present disclosure includes removable fastening mechanisms that have both sufficient stiffness to bear a load and the ability to fit securely on a wide-range of sizes and shapes of tubing, including tapered tubing.

Embodiments of the invention include a fastening mechanism with a first body part which may have a first pair of holes disposed towards the top of the first body part, a second pair of holes disposed towards the bottom of the first body part, and a first inner surface. A second body part may have a third pair of holes disposed towards the top of the second body part, a fourth pair of holes disposed towards the bottom of the second body part, and a second inner surface. The first body part may be attached to the second body part by a first pair of bolts passing through the first pair of holes and the third pair of holes and by a second pair of bolts passing through the second pair of holes and the fourth pair of holes. An accessory mount may be attached to the first body part. The first inner surface and the second inner surface may be capable of fitting securely onto a tapered tube or a straight tube.

Embodiments of the invention include a fastening mechanism with a first body part having a first inner surface, and a second body part having a second inner surface. A first fastening set may be disposed at a first end of the first and second body parts. A second fastening set may be disposed at a second end of the first and second body parts. The first and second fastening sets may be capable of securing the first and second body parts about a central tube. The central tube may have tapered dimensions.

The first inner surface and the second inner surface may each have a first subsurface and a second subsurface, the first subsurfaces may have a first contour, the second subsurfaces may have a second contour, and the first contour may be different from the second contour. The first and second contours may correspond to different sizes of bicycle tubing. The inner surfaces may be made of a protective material, such as rubber or soft plastic, to avoid damaging the tubing and improve grip.

The foregoing discussion in the Summary of the Disclosure is for example only and is not intended to limit the scope of the claimed invention(s) or the embodiments described below.

BRIEF DESCRIPTION OF THE DRAWINGS

FIG. 1a shows an embodiment of a clamp with dual fastening sets and an accessory mount.

FIG. 1b shows an embodiment of a clamp without dual fastening sets or an accessory mount provided.

FIG. 1c shows an embodiment of a clamp with dual fastening sets and a threaded hole for attaching to an accessory.

FIG. 1d shows an embodiment of a clamp with dual fastening sets and an eyelet for attaching to an accessory.

DETAILED DESCRIPTION

Figure 2:
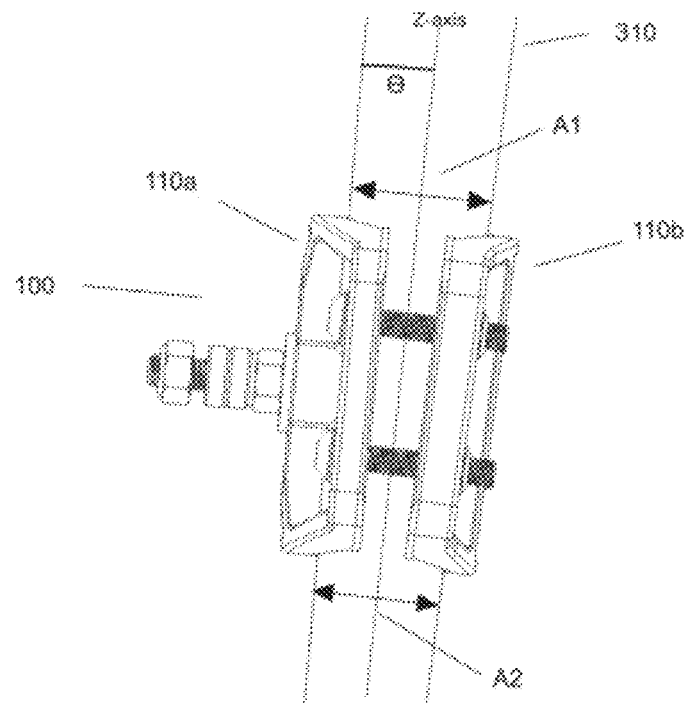
FIG. 2 shows an embodiment of a clamp with dual fastening sets attached to tapered tubing.

As shown in FIG. 1a, in embodiments of the disclosure, clamp 100 may include dual body parts 110a and 110b and dual fastening sets 120a and 120b. As indicated in FIG. 1b, each of dual parts 110a and 110b may include two pairs of holes 115a and 115b disposed at opposite ends of the body part in the axial direction (labeled the Z-axis in FIG. 2). That is, each of dual body parts 110a and 110b may include a total of four (4) holes for receiving fastening elements—one pair of holes 115a disposed towards the top and another pair of holes 115b disposed towards the bottom of the body part.

As shown in FIG. 1a, each of dual fastening sets 120a and 120b may include two bolts 200. When dual body parts 110a and 110b are aligned, bolts 200 may pass through adjacent pairs of holes 115a and 115b in each of dual body parts 110a and 110b, thereby allowing clamp 100 to be secured about a central tubing by tightening bolts 200.

As shown in FIG. 1a, accessory mount 140 may be provided on dual body part 110b for mounting an accessory to the clamp. Accessory mount 140 may include a bolt or screw for securely connecting to an accessory. Other fastening mechanisms also may be used—instead of or in addition to a bolt or screw—such as a threaded hole, an eyelet, or a rod with multiple eyelets. Accessory mount 140 may also be custom designed to fit a particular accessory. In some embodiments, accessory mount 140 may be provided on both dual body parts 110a and 110b.

As shown in FIG. 1b, clamp 100 may have an area for attaching various types of accessory mounts, as needed. FIG. 1c shows an embodiment of clamp 100 having threaded hole 141 for attaching to an accessory with an appropriate receiving end (e.g., a threaded screw). FIG. 1d shows an embodiment of clamp 100 having eyelet 142 for attaching to an accessory with an appropriate receiving end.

Advantageously, providing dual fastening sets at opposite ends of the body allows the clamp to fit securely onto tapered tubing. As shown in the example of FIG. 2, when attached to tapered tubing 310, distance A1 between dual body parts 110a and 110b at one end of clamp 100 may be greater than distance A2 between the parts at the opposite end of clamp 100. Distances A1 and A2 may be about equal to the major axes of the ellipse (or circle) formed by tubing 310 at the respective end points. In this way, angle θ of interior surface 130 (relative to the central Z axis) may match that of tapered tubing 310, providing better grip and avoiding slippage between clamp 100 and tubing 310. Advantageously, angle θ of surface 130 may naturally align with tubing 310 when dual fastening sets 120a and 120b are tightened about surface 310, without requiring any special adjustment by the user.

Figure 3:
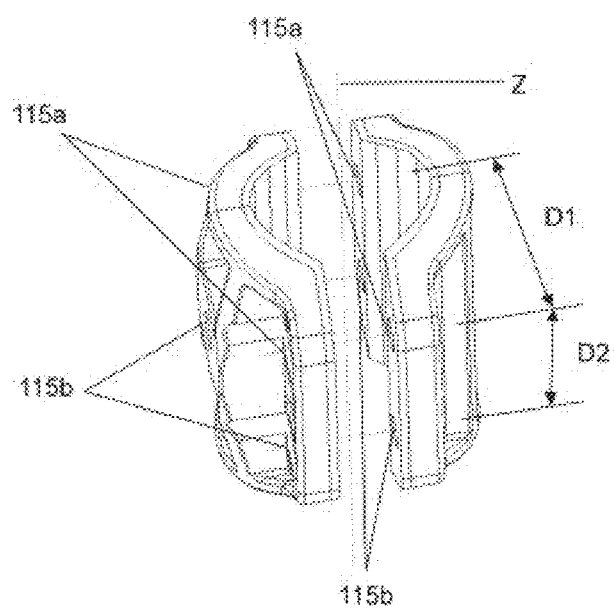
FIG. 3 shows an embodiment of a clamp with dual fastening sets having dimensions for attaching to multiple sizes and shapes of bicycle tubing.

FIG. 3 shows an embodiment of clamp 100 with dimensions that allow it to fit onto many sizes of bicycle tubing. D1 represents the distance between holes within a pair in the direction perpendicular to the Z-axis—that is, the distance between the two holes in either pair 115a or 115b. D2 represents the distance between hole pairs 115a and 115b in the direction of the Z-axis. In embodiments of clamp 100, D1 may be in the range of 22.5 to 34.5 mm and D2 may be 25 mm. For example, the sizes listed Table I were found to be optimal for fitting clamp 100 onto various sizes and shapes of bicycle tubing, although other sizes may also be used:

TABLE 1

| SIZE | D1 (mm) | D2 (mm) |
|---|---|---|
| SMALL | 22.5 | 25 |
| MEDIUM | 27.5 | 25 |
| LARGE | 34.5 | 25 |

Each bolt 200 used in the dual fastening sets may include a nut and/or washer. Bolts 200 may be used to securely fasten dual body parts 110a and 110b around a central tubing by tightening nuts onto bolts 200. Bolts 200 may be used with unthreaded holes 115a and 115b. Alternatively, holes 115a and 115b may be threaded to provide additional grip and further reduce the possibility of relative movement between dual body parts 110a and 110b. As would be understood by a person of skill in the art in view of the present disclosure, other fasteners may be used instead of bolts 200, such as screws, wing-nuts, clips, hose clamps, quick release cams, or cable ties. For example, screws may be used together with threaded holes 115a and 115b without providing nuts or washers. As another example, in some embodiments, dual body parts 110a and 110b may be connected on one side by a hinge and may clip, snap, or bolt together on the other side.

Figure 4A:
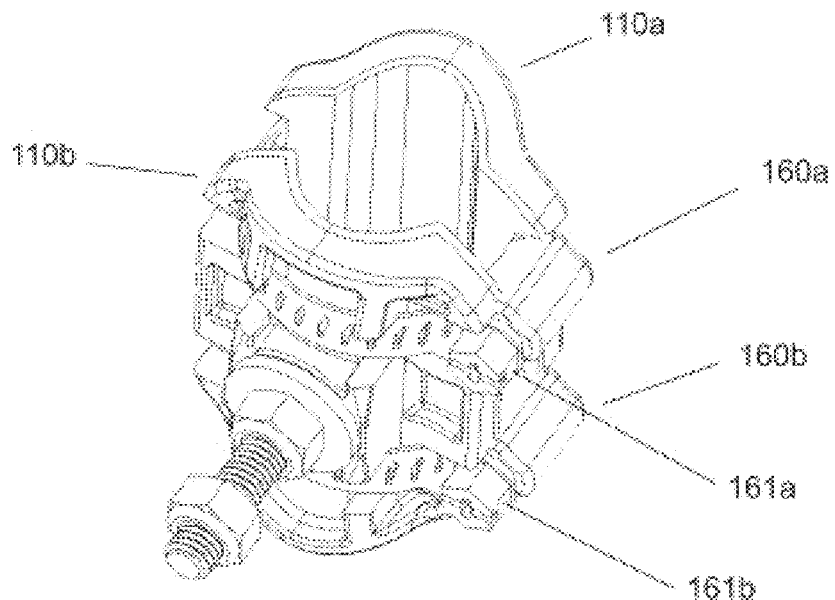
FIGS. 4a-b show different perspectives of an embodiment of a clamp where the dual fastening sets include hose clamps.
Figure 4B:
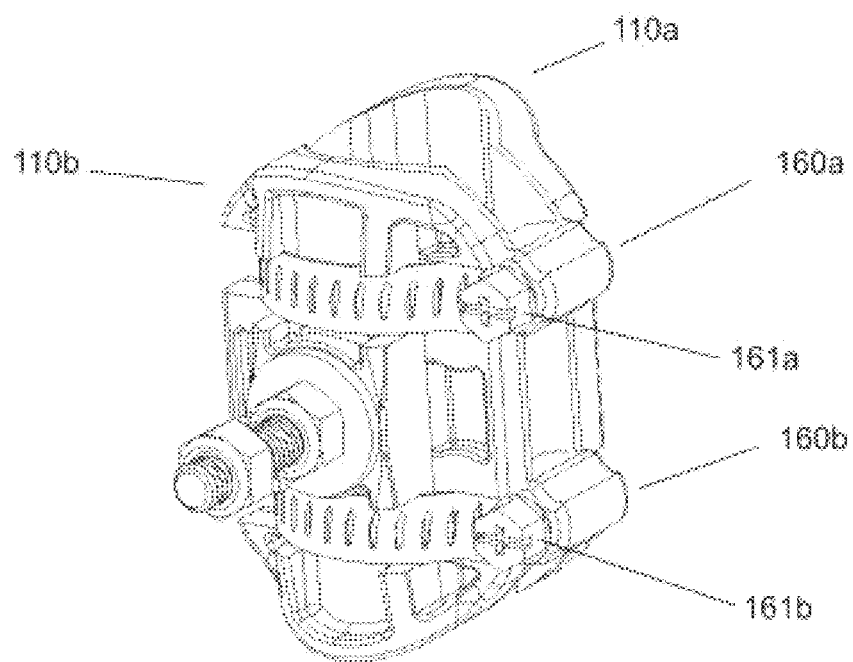

FIGS. 4a and 4b show different perspectives of an embodiment of clamp 100 in which two hose clamps 160a and 160b are used to fasten body parts 110a and 110b about a central tube (not shown) by tightening screws 161a and 161b A benefit of this embodiment is that it requires fewer parts and only two screws (as opposed to four bolts) need to be tightened.

Dual body parts 110a and 110b of clamp 100 may be formed of plastic, metal, or ceramic, or another material (or combination of materials) with suitable hardness and durability to withstand the clamping forces and bear a load, as would be understood by a person of skill in the art in view of the present disclosure.

Each dual body part 100a and 110b of clamp 100 may include an inner surface and one or more subsurfaces for gripping a central tube. The inner surfaces may be formed of a softer material (e.g., having a greater elasticity) than the body, for example, plastic or rubber with a lower durometer. The inner surface(s) may have one or more contours for fitting securely onto tubing of a particular size. The greater elasticity of the inner surfaces may help to protect the inner tubing from damage, spread the load force across the clamp, and improve grip.

Figure 5A:
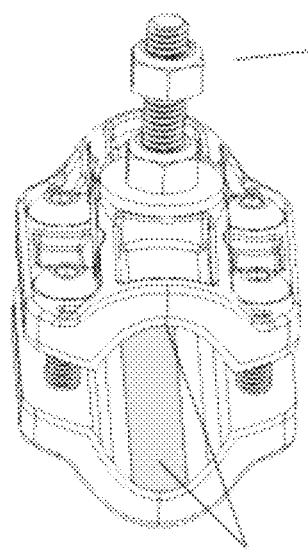
FIGS. 5a-b show an embodiment of a clamp with tour contours, where the contour with dimensions 28 mm×19 mm is highlighted.
Figure 5B:
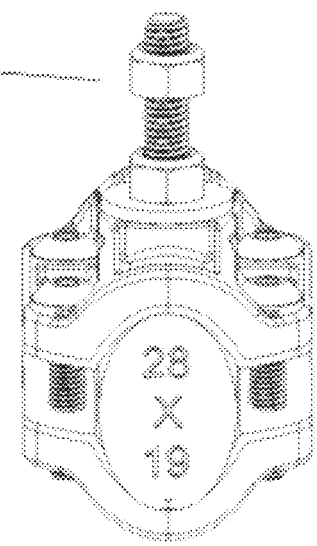
Figure 6A:
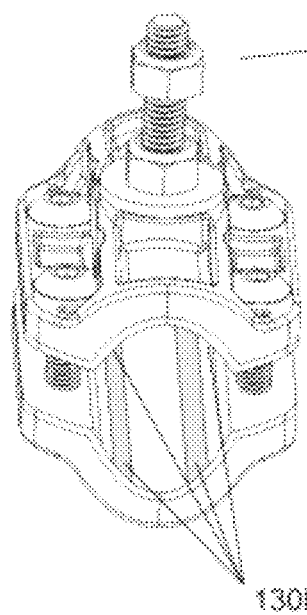
FIGS. 6a-b show an embodiment of a clamp with four contours, where the contour with dimensions 27.5 mm×20 mm is highlighted.
Figure 6B:
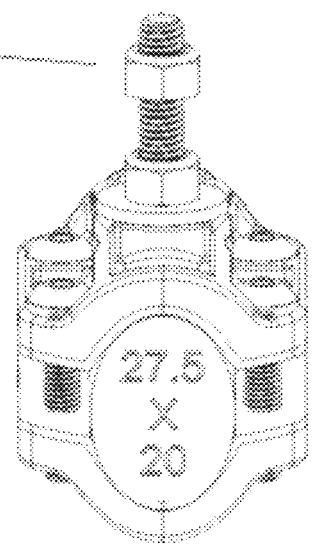
Figure 7A:
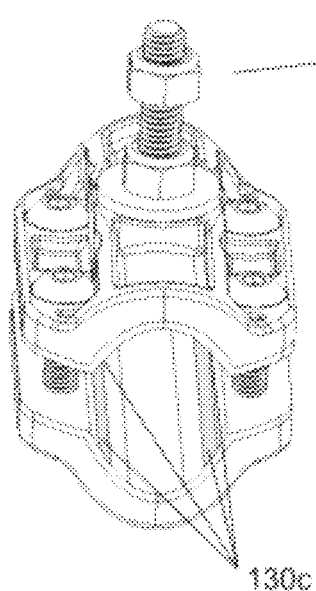
FIGS. 7a-b show an embodiment of a clamp with four contours, where the contour with dimensions 29 mm×21.5 mm is highlighted.
Figure 7B:
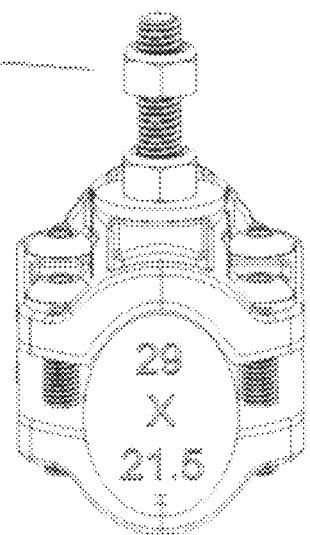
Figure 8A:
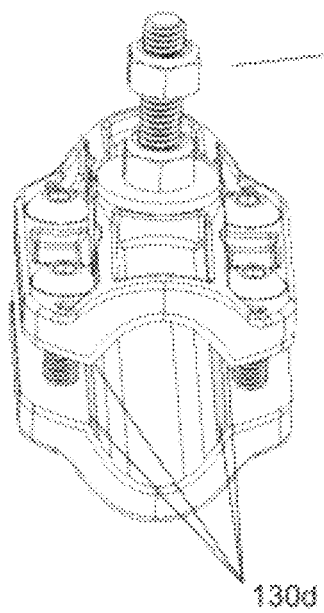
FIGS. 8a-b show an embodiment of a clamp with four contours, where the contour with dimensions 22 mm×22 mm (round) is highlighted.
Figure 8B:

FIGS. 5a-8b show an embodiment of clamp 100 wherein each dual body part has a central inner subsurface and three inner subsurface pairs disposed adjacent to each other. Each of the central inner subsurface 130a and the three inner subsurface pairs 130b-d may have a contour for fitting securely onto a particular size tube, which may be different from each other. Thus, inner subsurfaces 130a-d may allow clamp 100 to fit securely onto tubing of at least four different sizes and shapes, although a different number of contours may be provided. As shown in FIGS. 5a-b, inner subsurface 130a is designed to fit tubing of size 28 mm×19 mm. As shown in FIGS. 6a-b, inner subsurfaces 130b are designed to fit tubing of size 27.5 mm×20 mm. As shown in FIGS. 7a-b, inner subsurfaces 130c are designed to fit tubing of size 29 mm×21.5 mm. As shown in FIGS. 8a-b, inner subsurfaces 130d are designed to fit tubing of size 22 mm×22 mm (that is, round tubing of diameter 22 mm). These sizes correspond to common dimensions of bicycle tubing, which makes this embodiment of clamp 100 particularly useful for attaching bicycle accessories to tubing of various sizes and shapes. In particular, when attached to tubing of any of the four dimensions—28 mm×19 mm, 27.5 mm×20 mm, 29 mm×21.5 mm, or 22 mm×22 mm—at least one inner subsurface from each body part 110a and 110b will fit securely onto the tubing, thereby allowing clamp 100 to bear a load without vibration or slippage.

As would be understood by a person of skill in the art in view of the present disclosure, other numbers of inner subsurfaces having other contours may be used, depending on the particular application. For example, contours may be selected to fit a wide range of common sizes and shapes of bicycle tubing, including 28 mm×19 mm, 27.5 mm×20 mm, 29 mm×21.5 mm, 22 mm×22 mm, 30 mm×12.5 mm, 28.5 mm×16.5 mm, 29 mm×16 mm, 34 mm×23 mm, 24 mm×24 mm, 28.6 mm×28.6 mm, and/or 31.8 mm×31.8 mm. A single inner subsurface may be used or, alternatively, five or more inner subsurfaces may be used. As would be understood by a person of skill in the art in view of the present disclosure, embodiments of clamp 100 may be used in other applications besides bicycle and vehicle accessories. In general, embodiments of clamp 100 may be used wherever it is desirable to attach a load to a tube, pipe, or other object with an approximately elliptical cross-section and, in particular, wherever it is desirable to have a single clamp that fits onto various sizes and shapes of tubing.

It should be understood that, while various embodiments have been described herein, the claimed invention(s) should not be limited by those embodiments. To the contrary, the foregoing summary, detailed description, figures, and abstract have been presented for illustrative purposes, and are not meant to limit the claims. As a person of skill in the art in view of the present disclosure would recognize, various changes can be made to the embodiments described herein without departing from the scope and spirit of the present invention(s).

The invention claimed is:

1. A fastening mechanism comprising:
   a first body part comprising a first pair of holes disposed towards the top of the first body part, a second pair of holes disposed towards the bottom of the first body part, and a first inner surface;
   a second body part comprising a third pair of holes disposed towards the top of the second body part, a fourth pair of holes disposed towards the bottom of the second body part, and a second inner surface; and
   the first inner surface and the second inner surface each comprise a first subsurface with a first elliptical contour and a second subsurface with a second elliptical contour,
   wherein the first body part is attached to the second body part by a first pair of bolts passing through the first pair of holes and the third pair of holes and by a second pair of bolts passing through the second pair of holes and the fourth pair of holes,
   wherein the first subsurfaces and the second subsurfaces are parallel to a central axis of the fastening mechanism and parallel to each other, and
   wherein the first elliptical contour is different from the second elliptical contour.

2. The fastening mechanism of claim 1, further comprising:
   a rigid accessory mount disposed on the first body part.

3. The fastening mechanism of claim 2, wherein the accessory mount comprises at least one of a bolt, a screw, a threaded hole, or an eyelet.

4. The fastening mechanism of claim 1, wherein a first distance between the first pair of holes and the second pair of holes in an axial direction is 25 mm.

5. The fastening mechanism of claim 4, wherein a second distance between each hole in the first pair of holes in a direction perpendicular to the axial direction is between 22.5 mm and 34.5 mm.

6. The fastening mechanism of claim 1, wherein a distance between each hole in the first pair of holes in a direction perpendicular to an axial direction is between 22.5 mm and 34.5 mm.

7. The fastening mechanism of claim 1, wherein the first inner surface and the second inner surface are capable of fitting securely onto a tapered tube.

8. The fastening mechanism of claim 1, wherein the first subsurfaces and the second subsurfaces each comprise a rubber material having greater elasticity than the first and second body parts for gripping a central tube.

9. The fastening mechanism of claim 1, wherein the first elliptical contour has a first diameter, the second elliptical contour has a second diameter, and the first diameter is different from the second diameter.

10. The fastening mechanism of claim 9, wherein each of the first and second inner surfaces further comprises a third subsurface having a third elliptical contour and a fourth subsurface having a fourth elliptical contour, and
    wherein the first, second, third, and fourth elliptical contours correspond to different dimensions of bicycle tubing.

11. The fastening mechanism of claim 1, wherein the first subsurface of the first inner surface is disposed opposite to the first subsurface of the second inner surface relative to the central axis of the fastening mechanism.

12. The fastening mechanism of claim 11, wherein the second subsurface of the first inner surface is disposed opposite to the second subsurface of the second inner surface relative to the central axis of the fastening mechanism.

13. The fastening mechanism of claim 1, wherein the first subsurfaces are capable of securely gripping a first tube, the second subsurfaces are capable of securely gripping a second tube, and the first tube and the second tube have different dimensions.

14. The fastening mechanism of claim 1, wherein the first and second elliptical contours correspond to first and second dimensions of bicycle tubing.

15. The fastening mechanism of claim 1, wherein the first subsurfaces and the second subsurfaces run parallel to the central axis of the fastening mechanism for a distance of at least 25 mm.

16. The fastening mechanism of claim 1, wherein the fastening mechanism is capable of securely fastening to a first tube with first dimensions corresponding to the first elliptical contour and, at a different time, to a second tube with second dimensions corresponding to the second elliptical contour.

* * * * *